United States Patent
Trim et al.

(10) Patent No.: US 10,726,584 B2
(45) Date of Patent: Jul. 28, 2020

(54) DISPLAYING A VIRTUAL EYE ON A WEARABLE DEVICE

(71) Applicant: INTERNATIONAL BUSINESS MACHINES CORPORATION, Armonk, NY (US)

(72) Inventors: Craig M. Trim, Ventura, CA (US); Lakisha R. Hall, Upper Marlboro, MD (US); Gandhi Sivakumar, Bentleigh (AU); Kushal Patel, Pune (IN); Sarvesh Patel, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/202,712

(22) Filed: Nov. 28, 2018

(65) Prior Publication Data

US 2020/0167968 A1 May 28, 2020

(51) Int. Cl.
*G06T 11/00* (2006.01)
*G06F 3/01* (2006.01)
*G06T 3/20* (2006.01)

(52) U.S. Cl.
CPC .............. *G06T 11/00* (2013.01); *G06F 3/012* (2013.01); *G06F 3/013* (2013.01); *G06T 3/20* (2013.01); *G06F 2203/011* (2013.01)

(58) Field of Classification Search
None
See application file for complete search history.

(56) References Cited

U.S. PATENT DOCUMENTS

| 9,678,346 B2 | 6/2017 | Nakada et al. | |
| 2014/0347265 A1* | 11/2014 | Aimone | G09G 3/003 345/156 |
| 2015/0079560 A1* | 3/2015 | Cowan | A61B 5/742 434/236 |
| 2017/0337476 A1* | 11/2017 | Gordon | G06N 5/022 |

(Continued)

FOREIGN PATENT DOCUMENTS

| CN | 101342704 | 1/2009 |
| CN | 102129706 | 7/2011 |

(Continued)

OTHER PUBLICATIONS

Capin et al., "Virtual Human Representation and Communication in Networked Virtual Environments", IEEE Computer Graphics and Applications, 17(2), pp. 42-53, 1997, 16 pages.

(Continued)

*Primary Examiner* — Ryan M Gray
(74) *Attorney, Agent, or Firm* — Brian Restauro; Andrew D. Wright; Roberts Calderon Safran & Cole, P.C.

(57) ABSTRACT

A computer-implemented method includes: receiving, by a computer device, and from a head position sensor, head position information that indicates a position of a user's head; receiving, by the computer device, and from an eye position sensor, eye position information that indicates a position of a sensed eye of the user; producing, by the computer device, eye image data that represents a desired eye image based on the head position information and the eye position information; and transmitting, by the computer device, the eye image data to a wearable device worn by the user.

19 Claims, 9 Drawing Sheets

(56) References Cited

U.S. PATENT DOCUMENTS

| | | | | |
|---|---|---|---|---|
| 2017/0364732 A1 | 12/2017 | Komogortsev | | |
| 2018/0004478 A1* | 1/2018 | Chen | ................... | G06F 3/1454 |
| 2018/0158246 A1* | 6/2018 | Grau | ................... | G06T 3/0093 |
| 2018/0174370 A1* | 6/2018 | Chen | ................ | G06K 9/00268 |
| 2018/0314881 A1* | 11/2018 | Sud | ..................... | G06N 3/0454 |
| 2019/0075239 A1* | 3/2019 | Gordon | ............ | G06K 9/00302 |

FOREIGN PATENT DOCUMENTS

| | | |
|---|---|---|
| CN | 105866955 | 8/2016 |
| CN | 105892073 | 8/2016 |
| CN | 107519622 | 12/2017 |
| JP | 2006065094 | 3/2006 |
| WO | 2016201015 | 12/2016 |
| WO | 2018014712 | 1/2018 |

OTHER PUBLICATIONS

Anonymous, "Visual Recognition", https://www.ibm.com/watson/services/visual-recognition/, IBM, accessed Oct. 10, 2018, 2 pages.
John, "What is Electrochromic Glass?", http://www.smartglassinternational.com/what-is-electrochromic-glass/, Smartglass, Sep. 28, 2010, 2 pages.
Due, "The future of smart glasses: An essay about challenges and possibilities with smart glasses", Working papers on Interaction and communication, 1(2), 1-21, Centre of Interaction Research and Communication Design, University of Copenhagen, ISBN 978-87-93300-02-6, 2014, 21 pages.
Mell et al., "The NIST Definition of Cloud Computing", NIST, Special Publication 800-145, Sep. 2011, 7 pages.

\* cited by examiner

DISPLAYING A VIRTUAL EYE ON A WEARABLE DEVICE

BACKGROUND

The present invention relates generally to the generation and display of visual representations of body parts and, more particularly, to the generation and display of a virtual human eye.

Interest is increasing in cognitive models that are enabled by Big Data platforms. Such models, referred to as "cognitive entities", are designed to remember the past, interact with humans, continuously learn, and refine responses for future instances. Cognitive capabilities enrich the automation of human needs based on time and situation and provide more dynamic responses and user satisfaction. Advancements in the telecommunication industry have been a key enabler for the success of many technologies, including artificial intelligence (AI), by breaking the barrier of various factors like sedentary operations, lower bandwidth, etc. Fourth generation broadband cellular network technology ("4G") has pushed such technologies to higher levels by parallelizing the physical channel and thus providing higher bandwidth. Fifth generation broadband cellular network technology ("5G") is expected to serve as a rich enabler to push the dependent technologies to even higher levels through mobility bandwidth of 1 GBPS, convergence of Internet of Things ("IoT") device access, etc. An advantageous feature of 5G is that the network itself is intelligent and cognitive.

SUMMARY

In a first aspect of the invention, there is a computer-implemented method including receiving, by a computer device, and from a head position sensor, head position information that indicates a position of a user's head; receiving, by the computer device, and from an eye position sensor, eye position information that indicates a position of a sensed eye of the user; producing, by the computer device, eye image data that represents a desired eye image based on the head position information and the eye position information; and transmitting, by the computer device, the eye image data to a wearable device worn by the user.

In another aspect of the invention, there is a computer program product including a computer readable storage medium having program instructions embodied therewith. The program instructions are executable by a computing device to cause the computing device to receive from a head position sensor, head position information that indicates a position of a user's head; receive from an eye position sensor, eye position information that indicates a position of a sensed eye of the user; produce eye image data that represents a desired eye image based on the head position information and the eye position information; and transmit the eye image data to a wearable device worn by the user.

In another aspect of the invention, there is system including a processor, a computer readable memory, and a computer readable storage medium. The system includes program instructions to receive from a head position sensor, head position information that indicates a position of a user's head; program instructions to receive from an eye position sensor, eye position information that indicates a position of a sensed eye of the user; program instructions to produce eye image data that represents a desired eye image based on the head position information and the eye position information; and program instructions to transmit the eye image data to a wearable device worn by the user. The program instructions are stored on the computer readable storage medium for execution by the processor via the computer readable memory.

Embodiments of the invention provide a cognition enabled apparatus for displaying human eyes that works on 5G service orchestration. Embodiments provide the computation and resultant data for a virtual human eye based on various insights via an exclusive 5G cosmetic channel.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
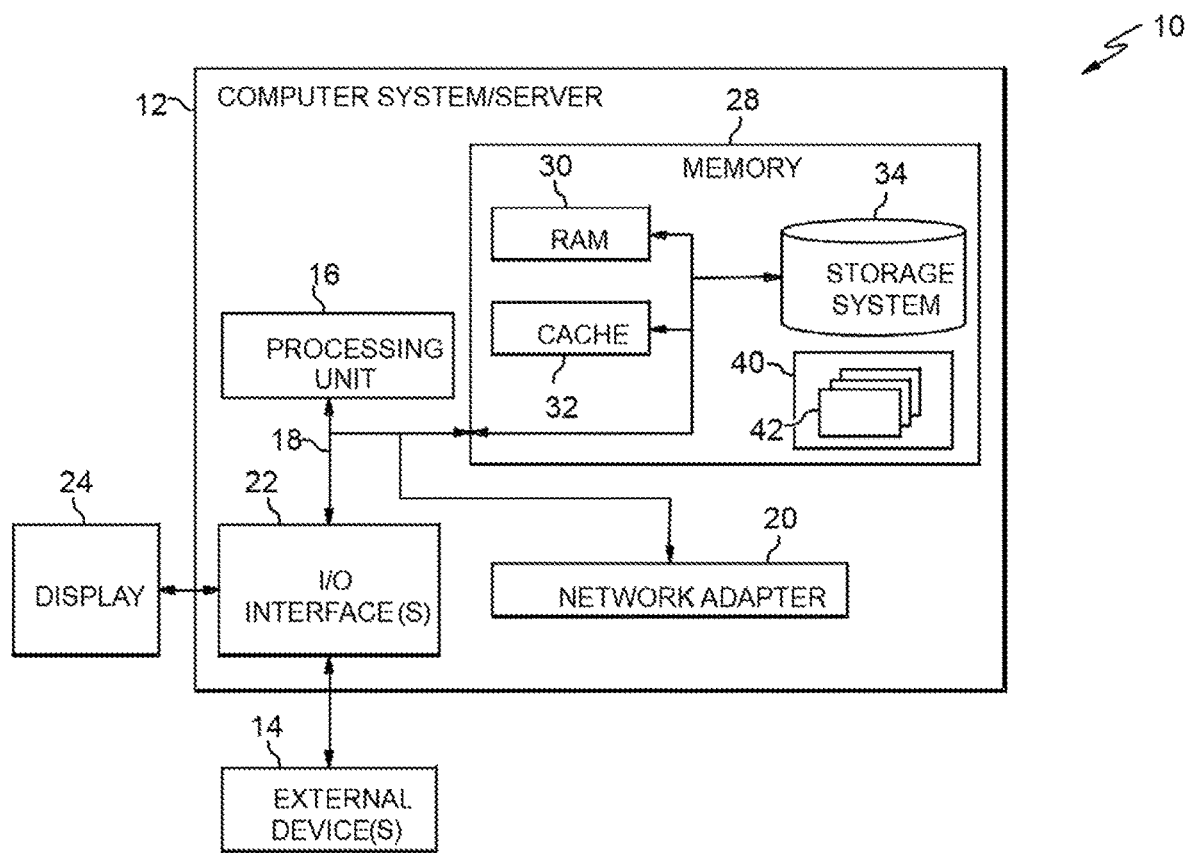
FIG. 1 depicts a cloud computing node according to an embodiment of the present invention.

The present invention relates generally to the generation and display of visual representations of body parts and, more particularly, to the generation and display of a virtual human eye. According to aspects of the invention, position information regarding the position of a user's head and eye is used to generate eye image data that is sent to a wearable device such as, for example, smart glasses worn by the user. The wearable device then displays on the wearable device an image of the user's eye based on the eye image data. In embodiments, other information in addition to the head position data and the eye position data is used to generate the eye image data. In this manner, implementations of the invention produce an image of a user's eye that is esthetically pleasing.

Advantageously, embodiments of the invention generate eye image data from sensed positions of biological features and uses the eye image data to create an image of an eye on smart glasses. Thus, aspects of the invention provide improvements to the functioning of a computing system that provides an eye image on a wearable device worn by a user. More specifically, aspects of the invention utilize the unconventional steps of determining based on information produced by eye and head position sensors a desired appearance of a user's eye and then producing an image of the desired appearance on smart glasses worn by the user. Thus, a technical solution to the technical problem of producing an image of a desired eye appearance to cover an eye is provided.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
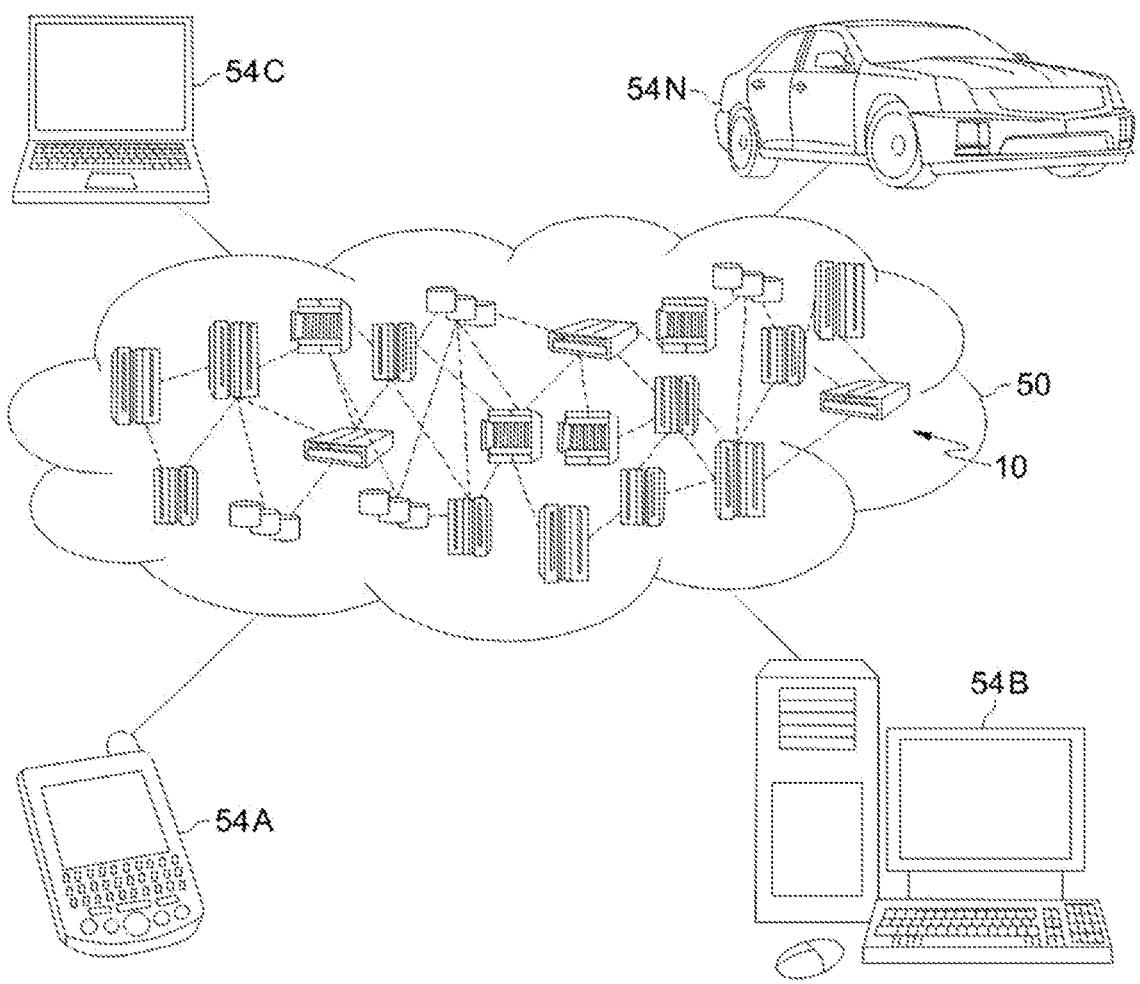
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
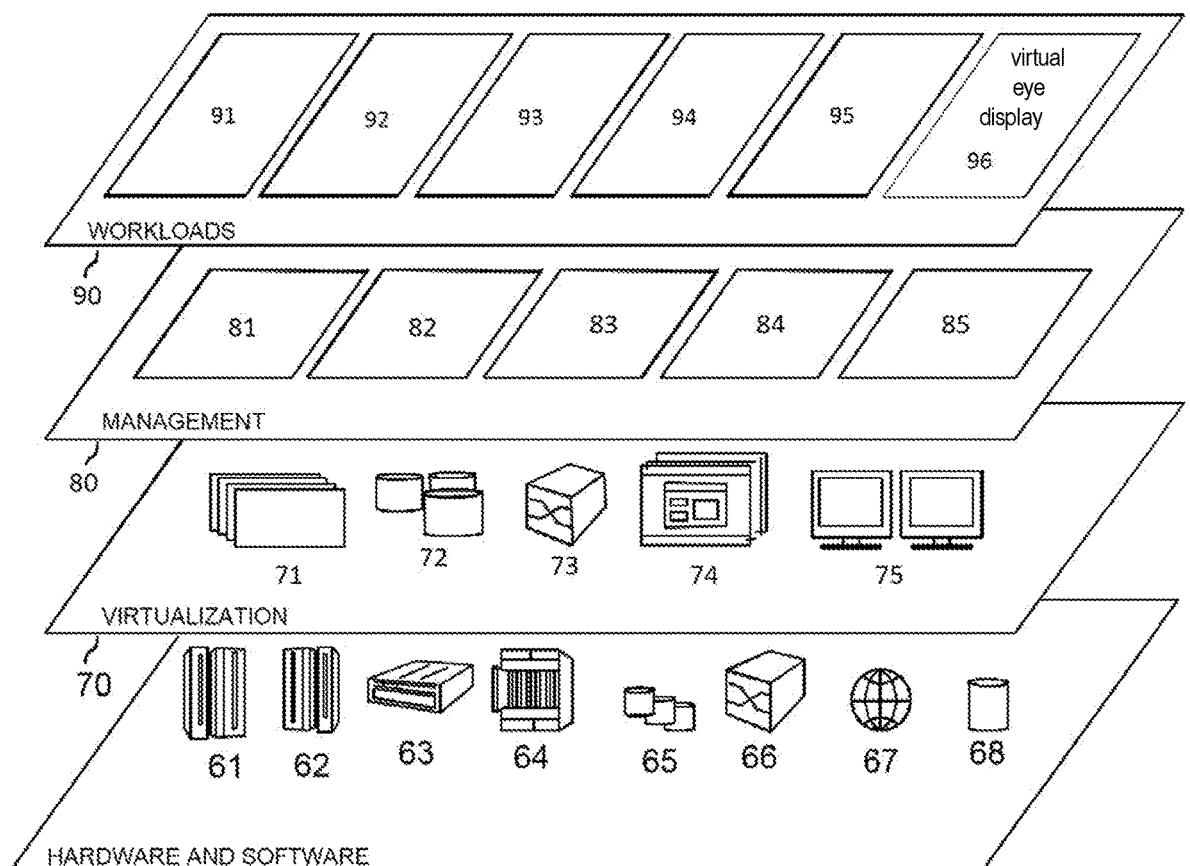
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below.

Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and virtual eye display 96.

Implementations of the invention may include a computer system/server 12 of FIG. 1 in which one or more of the program modules 42 are configured to perform (or cause the computer system/server 12 to perform) one of more functions of the virtual eye display 96 of FIG. 3. For example, the one or more of the program modules 42 may be configured to: receive from a head position sensor, head position information that indicates a position of a user's head; receive from an eye position sensor, eye position information that indicates a position of a sensed eye of the user; produce eye image data that represents a desired eye image based on the head position information and the eye position information; and transmit the eye image data to a wearable device worn by the user.

To the extent implementations of the invention collect, store, or employ personal information provided by, or obtained from, individuals (for example, eye image data, personality information, eye condition information, etc.), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some people are displeased with the appearance of one or both of their eyes and desire a system that permits them to present a different look to other people. There is a lack of acceptable technical solutions for persons in this situation. One option for the person is to wear dark glasses to hide the subject eye. In many cases the subject eye functions properly, but the person is self-conscious of the appearance of the eye. Smart glasses provide some functionality but lack the appearance of natural eye movement. There is no mechanism available for smart glasses that can effectively create a virtual eye manifestation that improves the appearance of the natural eye. Dynamic control for a virtual eye in smart eyewear is missing today. Embodiments of the invention provide a solution to this problem.

Embodiments of the invention include a cognition enabled 5G based virtual eye using a 5G cosmetic channel. The 5G cosmetic channel receives streaming inputs from various resources and creates a dynamically moving virtual eye on smart glasses. The dynamically moving virtual eye creates a manifestation of a natural human eye and serves as an enhanced cosmetic service using 5G service orchestration. In embodiments, the eye and a portion of the surrounding skin are included in the manifestation. In embodiments, the eyebrow is also included in the manifestation. Including the eyebrow adds another feature that accentuates the emotion of the user and, therefore, creates a realistic virtual representation of the eye.

Embodiments of the invention include systems and apparatuses which co-exist with smart device monitoring tools, identify and collect information from various resources and from IoT enabled devices placed over the glass of the smart glasses, identify the angular movement of the neck and objects seen by the person, and instruct a glass display controller to tune the virtual eye appearance based on the insights collected. Embodiments of the invention collect the information from various devices placed on the smart glass and a 5G enabled controller transmits the collected data to the 5G service orchestration which contains a visual recognition service on top of the angular movement detector (gaze detector) and insights manager. The vision recognition service detects the angle to which the person is viewing via monitoring the person's head and captured image and accordingly triggers the virtual eye for a corresponding appearance model. This will create a virtual human eye on the smart glasses/eyewear. Once the user subscribes to or purchases the 5G cosmetic channel, the steam of the collected data will be transferred to the 5G service orchestration and the communication to the virtual eye's controller is performed using a 5G telecommunication network. Embodiments also capture the eyebrow movement, the appearance of the neighboring eye and other parameters like the recognized image and eye movement. In embodiments, the smart eyewear is a SIM based device that communicates over the 5G cosmetic channel and sends the data to the backend virtual eye so that a more accurate eye image is displayed on the smart eyewear. For example, if a person sees something shocking, then the virtual eye should reflect the same (like a human eye looks when a person is shocked).

Similarly, if the user is looking at an object with concentration, then the eye image should reflect the same. Embodiments of the invention collect information from location services, weather profile, and IoT device integration APIs, and consider this information when determining the circumstances in which the user currently exists. Based on the situational context, the eye's inclination is determined and updated to the smart eyewear for respective projection. For example, if the weather is detected as sunny, then the eye autonomously squints and/or a burning eye appearance (a red or watering eye, for example) is produced.

Embodiments of the invention collect information from devices incorporated into or attached to the smart eyewear, the current weather profile, a personality insights database, and information from GPS based location services as insights into the conditions that influence the appropriate eye image. Embodiments allocate an exclusive 5G cosmetic channel (for example, a dedicated communication channel on the telecommunication system), based on demand, for communicating selected client information over the 5G service orchestration via the dedicated channel. Embodiments collect the streaming information from the devices incorporated into or attached to the smart eyewear, such as internal and external camera sensors, and infer resulting virtual eye movement. Embodiments get the data from personality insights, habits, and weather profiles which affect the natural human eye and classify them for the situational contexts.

Embodiments reflect emotions to the virtual-eye based on the insights. For example, in embodiments, if a person is angry then the virtual eye might reflect the same with red-eyes. Embodiments learn from the normal eye movement from inward facing camera sensors and update the knowledge. Embodiments map this learning with the real eye and update the movement policies accordingly. Embodiments collect gaze information from eye and head position sensors, compute eye trajectory based on the gaze and angular information, and classify the same to generate the correct eye style.

Embodiments map the user's voice and eye behavior. For example, if someone is annoyed, their voice will indicate that and the virtual eye will reflect the same feelings. This can also be recognized via vision recognition of a normal functioning eye. Embodiments provide a client application programming interface (API) mechanism to collect the information from electrochromic sensors, cameras, and voice sensors. Embodiments provide a graphical user interface (GUI) to enable drag and drop selection and modification of various interfaces and priorities, and to interlink with a gesture (positive, negative, mixed) library and a instruction library. Embodiments configure the apparatus for instruction intervals such as, for example, continuous or driven by time intervals set or events.

Embodiments utilize visual micro camera sensors and audio sensors present in smart eyewear to capture inputs by a cognitive entity for computation. This is used to capture images which are used by the cognitive entity to recognize a weather profile and external factors. Embodiments gather information of weather data from sensors and/or from Internet-situated resources and manipulate the virtual eye movement based on policies updated with the information and data.

Embodiments update a color selection policy and priorities based on a movement of the user. For example, for a person that is detected as travelling from a cloudy environment to a sunny environment, the color of the eye and/or the size of the pupil is adjusted accordingly based, for example, on the brightness of the environment.

Figure 4:
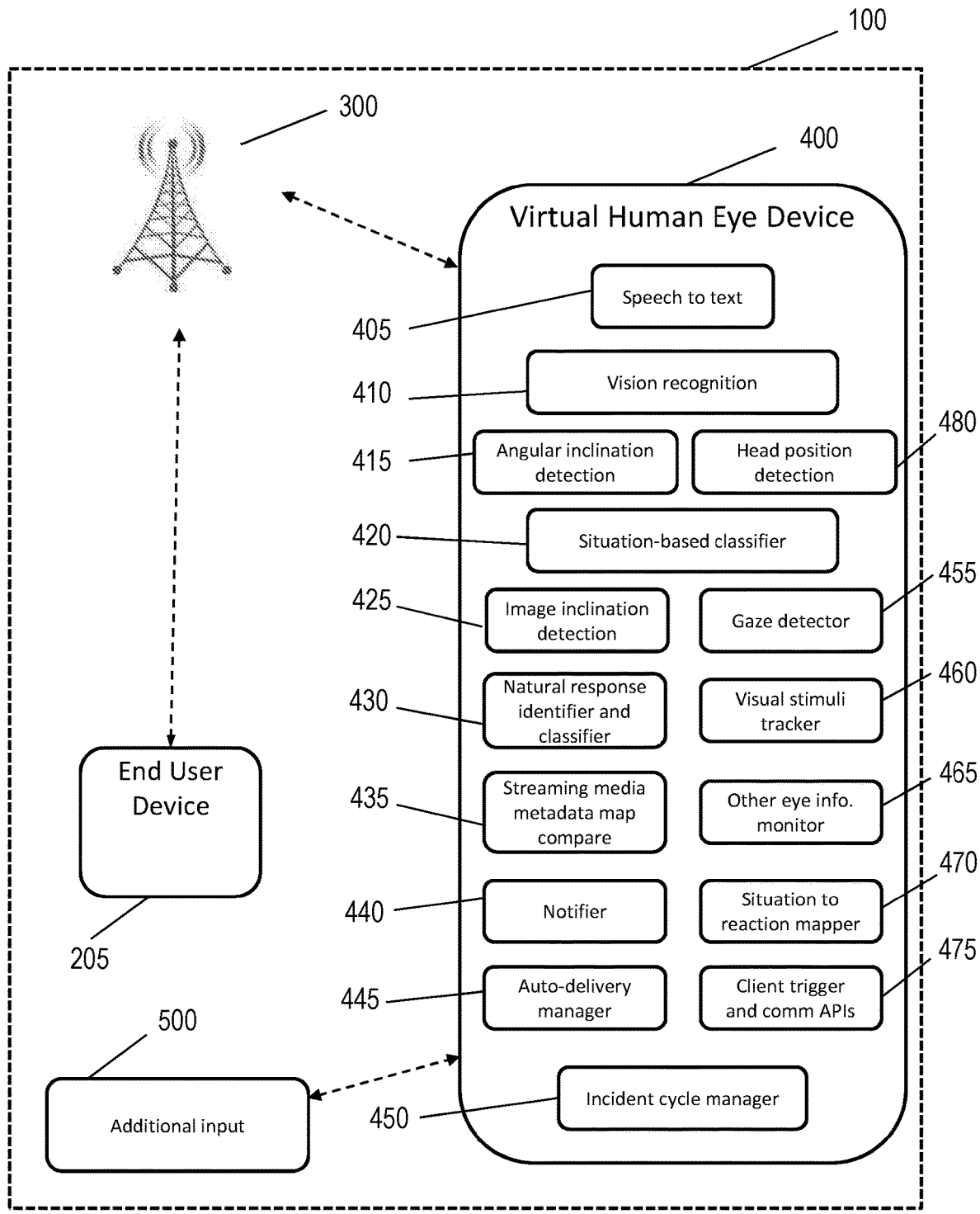
FIG. 4 shows a block diagram of an exemplary environment in accordance with aspects of the invention.

FIG. 4 shows a block diagram of an exemplary environment in accordance with aspects of the invention. In embodiments, the environment includes an eye imaging system 100 that includes an end user device 205 such as, for example, smart glasses or other wearable device. Also included in the environment is a virtual human eye device 400 that performs various processing to produce eye image data that is transmitted to the end user device 205 by way of, in this example, a 5G telecommunication network 300. In embodiments, the virtual human eye device 400 is a server that comprises one or more of the elements of the computer system/server 12 of FIG. 1. In embodiments, the virtual human eye device 400 is located remotely from the end user device 205. In embodiments, the virtual human eye device 400 resides on a computing device that is directly attached to the end user device 205 either through a wireless connection or a wired connection. While a 5G telecommunication network 300 is included in this example, it is noted that other telecommunication networks or other type of networks can be used.

As described above, that virtual human eye device 400 processes various information to produce eye image data that is then sent to the end user device 205 for the end user device 205 to use to generate an image of the user's eye. The generated image is displayed on the end user device 205 to present an eye image that the user prefers to the appearance of their actual eye. In embodiments, the generated image is displayed on the end user device by LED, LCD, projectors, or other display devices 206. Display devices 206 are integral to, or separate from, the end user device 205. In order to generate a realistic looking eye image, the virtual human eye device 400 receives various information that is relevant to the creation of the eye image. In this example, a speech to text module 405 converts speech collected by the end user device 205 and converts the speech to text. In embodiments, this speech collection is achieved by a microphone that is integral to the end user device 205, attached to the end user device 205, or located somewhere else on the user's body or remotely from the user's body. In embodiments, a vision recognition module 410 interprets video data that is collected by the end user device 205 and determines from the video data various information (environment information) that indicates an environment of the user such as, for example, what the user is looking at and/or the surroundings of the user. In embodiments, this video collection is achieved by a video recording device that is integral to the end user device 205, attached to the end user device 205, or located somewhere else on the user's body or remotely from the user's body.

In embodiments, an angular inclination detection module (or eye position sensor) 415 receives eye position information collected by the end user device 205 and determines from that information an angular position of one or both of the user's eyes. In embodiments, this collection is achieved by an attitude detection device such as, for example, a camera that is integral to the end user device 205 or attached to the end user device 205.

In embodiments, a head position detection module 480 receives head position information collected by the end user device 205 and determines from that information an angular position of the user's head. In embodiments, this collection is achieved by an attitude detection device (head position sensor) such as, for example, a gyroscope that is integral to the end user device 205 or attached to the end user device 205.

In embodiments, a situation-based classifier 420 determines a classification of the current situation of the user in order to access an appropriate set of eye image data that is to be used by a situation to reaction mapper 470. For example, if the user is in a situation that would normally result in a surprised user, then the situation-based classifier 420 flags a particular set of eye image data that is appropriate for a surprised user. The situation to reaction mapper 470 then finds the specific appropriate eye image data based on the particular set of eye image data flagged by the situation-based classifier 420, along with, in some embodiments, one or more of the other inputs, to determine the appropriate eye image data to transmit to the end user device 205.

In embodiments, an image inclination detection module 425 receives image angle/location information collected by the end user device 205 and determines from that information an angular inclination of the image relative to the position of the user's head. In embodiments, this collection is achieved by a video recording device that is integral to end user device 205 or attached to the end user device 205.

In embodiments, a natural response identifier and classifier 430 identifies and classifies a natural response to the current situation of the user in order to more precisely determine the appropriate eye image data. For example, based on input form various other of the modules in virtual human eye device 400, if it is determined that the user is watching a comedy show and that the user is laughing, the natural response identifier and classifier 430 determines that the user is in a situation where the user is laughing. As a result, eye image data that corresponds to a laughing person is selected. In embodiments, the virtual human eye device 400 accesses a personality insight database that is tailored to the user with personality information indicative of the user's personality. The virtual human eye device 400 uses the information in the personality insight database to more accurately predict the natural response of the user to any particular situation.

In embodiments, a streaming media metadata map compare module 435 monitors and/or searches streaming media for events or happenings at the geographic location of the user. This data is used by, for example, the situation-based classifier 420 and/or other modules in virtual human eye device 400 to more precisely determine the user's current situation. In embodiments, a notifier 440 sends notices to the end user device 205 that are displayed or audibly presented to the user. For example, the virtual human eye device 400 sends an audible notification to the user to inform the user that it is currently sending eye image data that represents a surprised look.

In embodiments, an auto-delivery manager 445 manages the frequency and other aspects of deliveries of eye image data (and in some embodiments, other data or notifications) to the end user device 205. For example, the auto-delivery manager 445 instructs the virtual human eye device 400 to send refreshed eye image data to the end user device 205 every second or at some other defined interval.

In embodiments, an incident cycle manager 450 monitors the incidents (such as surprises, fearful reactions, and reoccurring events) of the user to more precisely determine the user's current situation. For example, if the incident cycle manager 450 has historical data that shows that the user watches a particular comedy show on television every weeknight at 8:00 pm and other data and information collected by the virtual human eye device 400 indicates that the user is laughing, then the eye image data that corresponds to a laugh is reinforced as the proper eye image data.

Figure 7:
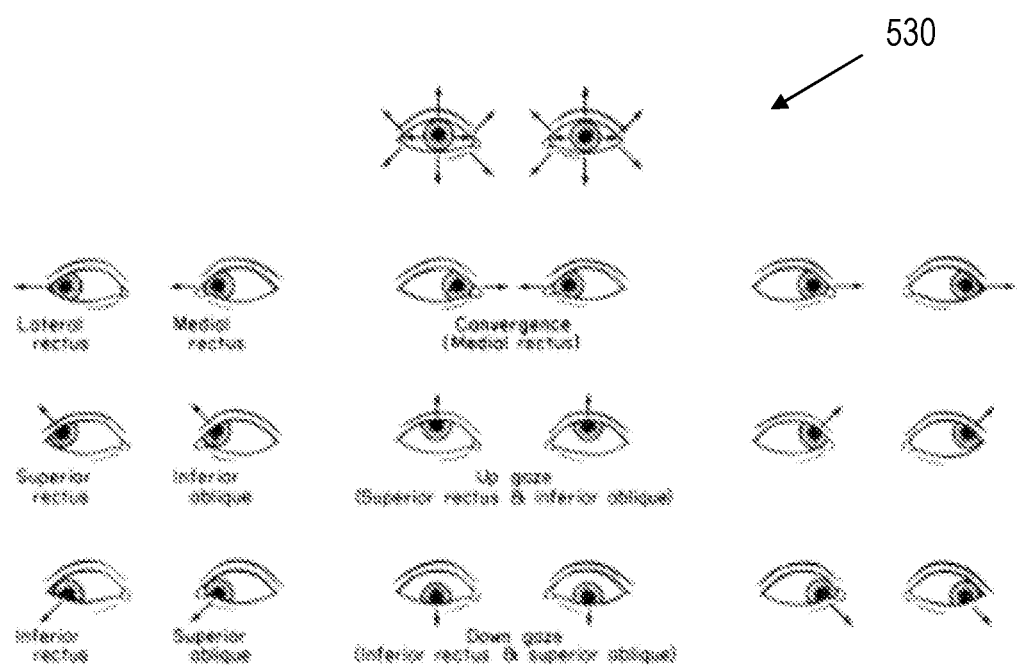
FIG. 7 shows an exemplary gaze mapper in accordance with aspects of the invention.

In embodiments, a gaze detector module 455 receives information from one or more of the modules in the virtual human eye device 400 and determines from that information what the "gaze" of the user should be given the situation of the user. An example of a gaze map 530 is shown in FIG. 7. For example, if the various information indicate that the user is looking downward to the left, then the gaze detector module 455 indicates that the corresponding gaze from gaze map 530 is appropriate for inclusion in the eye image data.

In embodiments, a visual stimuli tracker 460 monitors the visual stimuli (such as video content of media being viewed) of the user to more precisely determine the user's current situation. For example, if the visual stimuli tracker 460 has historical data that shows that when user sees a picture or video of an automobile accident the user is sad, then this information is used by the virtual human eye device 400 to more precisely determine the appropriate eye image data.

In embodiments, another eye information monitor 465 monitors other eye information beyond that monitored, collected, and/or processed by the other modules of the virtual human eye device 400.

In embodiments, client trigger and communication APIs 475 are included in the virtual human eye device 400 to enable the virtual human eye device 400 to transmit eye image data (and any other data or communication) in a language and format that a particular end user device 205 (or other device) uses. Different client trigger and communication APIs 475 are used for different end user devices 205. In embodiments, the virtual human eye device 400 contains multiple client trigger and communication APIs 475 to enable the virtual human eye device 400 to communicate with different devices.

In embodiments, all of the components of the virtual human eye device 400 are one or more of the program modules 42 of FIG. 1. In embodiments, any or all of the components/modules of the virtual human eye device 400 are split into a larger number of modules and/or combined into a smaller number of modules.

In embodiments, the virtual human eye device 400 receives additional input 500 from various sources. For example, additional input 500 includes weather conditions, social media feeds, news feeds, sensors such as body position sensors, body temperature sensors, body humidity sensors, and any other input that can indicate a condition or environment of the user.

Figure 5:
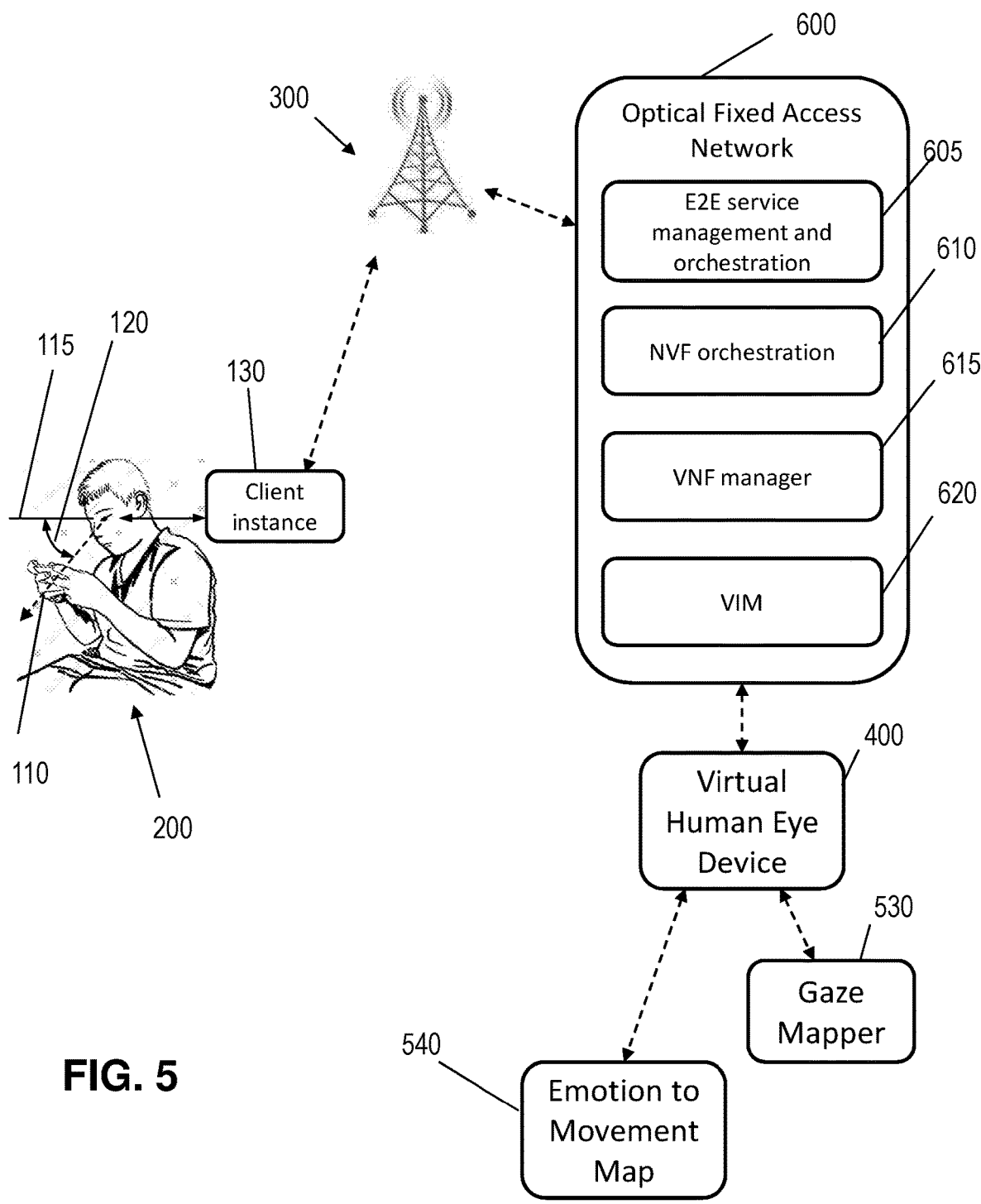
FIG. 5 shows a block diagram of an exemplary environment in accordance with aspects of the invention.

FIG. 5 shows an exemplary embodiment of the invention. In this example, the virtual human eye device 400 communicates with the 5G telecommunication network 300 through a fixed access network 600 (in this example an optical fixed access network 600). Fixed access networks such as optical fixed access network 600 connect subscribers to their provider of telecommunication service. This example of the optical fixed access network includes enterprise-to-enterprise (E2E) management and orchestration 605, network virtualized function (NVF) orchestration 610, a virtual network function (VNF) manager 615, and a virtual information manager (VIM) 620.

Figure 6:
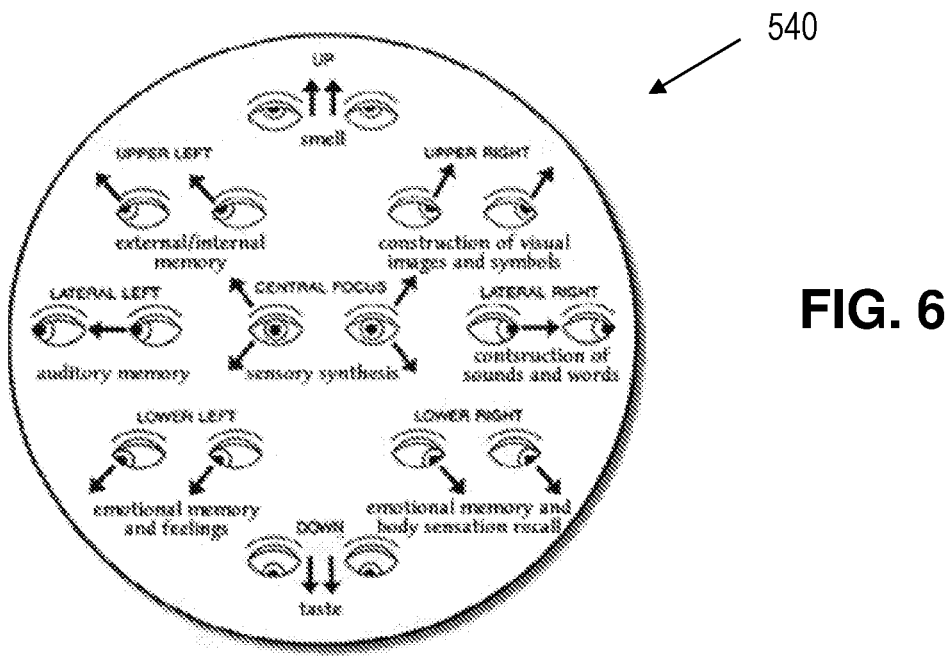
FIG. 6 shows an exemplary emotion to movement map in accordance with aspects of the invention.

FIG. 5 shows the virtual human eye device 400 having communication links to the gaze map 530, for example the gaze map 530 shown in FIG. 7 and referred to in the discussion regarding FIG. 4. The virtual human eye device 400 also, in this example, communicates with an emotion to movement map 540, an example of which is shown in FIG. 6. The emotion to movement map 540 contains a correlation between various eye positions or movements and associated emotions. The information in the emotion to movement map 540 is considered by the virtual human eye device 400 when determining what eye movement should be depicted by the eye image data.

FIG. 5 shows an example of a user 200 looking at an object and particular data that is collected (referred to in this figure as a client instance) and supplied to the virtual human eye device 400 to add precision to the eye image data. In this example, the left eye of the user 200 is looking down along an inclined view line 110 at the object. The inclined view line 110 forms an angular inclination 120 with a base axis 115 that is, in this example, horizontal. This information is used by the virtual human eye device 400 to generate the eye image data that displays an eye that is looking in the direction of the object. In this embodiment, the eye position data collected is that of one actual eye. In other embodiments, the eye position data collected is that of the other actual eye. In some embodiments, the eye position data is collected for both eyes. In embodiments, and the virtual human eye device 400 considers one or both sets of eye position data in conjunction with none, some, or all of the other data collected to determine the optimal eye image data.

Embodiments of the invention generate eye image data that is used to hide human emotion. In certain situations, people do not want their reactions to be seen by other people. For example, a person may not want to show sadness in public. The trigger to reflect/hide the situation is made based on the user inputs and detected user-specific insights and virtual eye controllers are triggered accordingly. As the proposed invention provides the ability to learn from history, it effectively identifies the emotional situations and maps it with sentiments and makes masking decisions accordingly.

Figure 8:
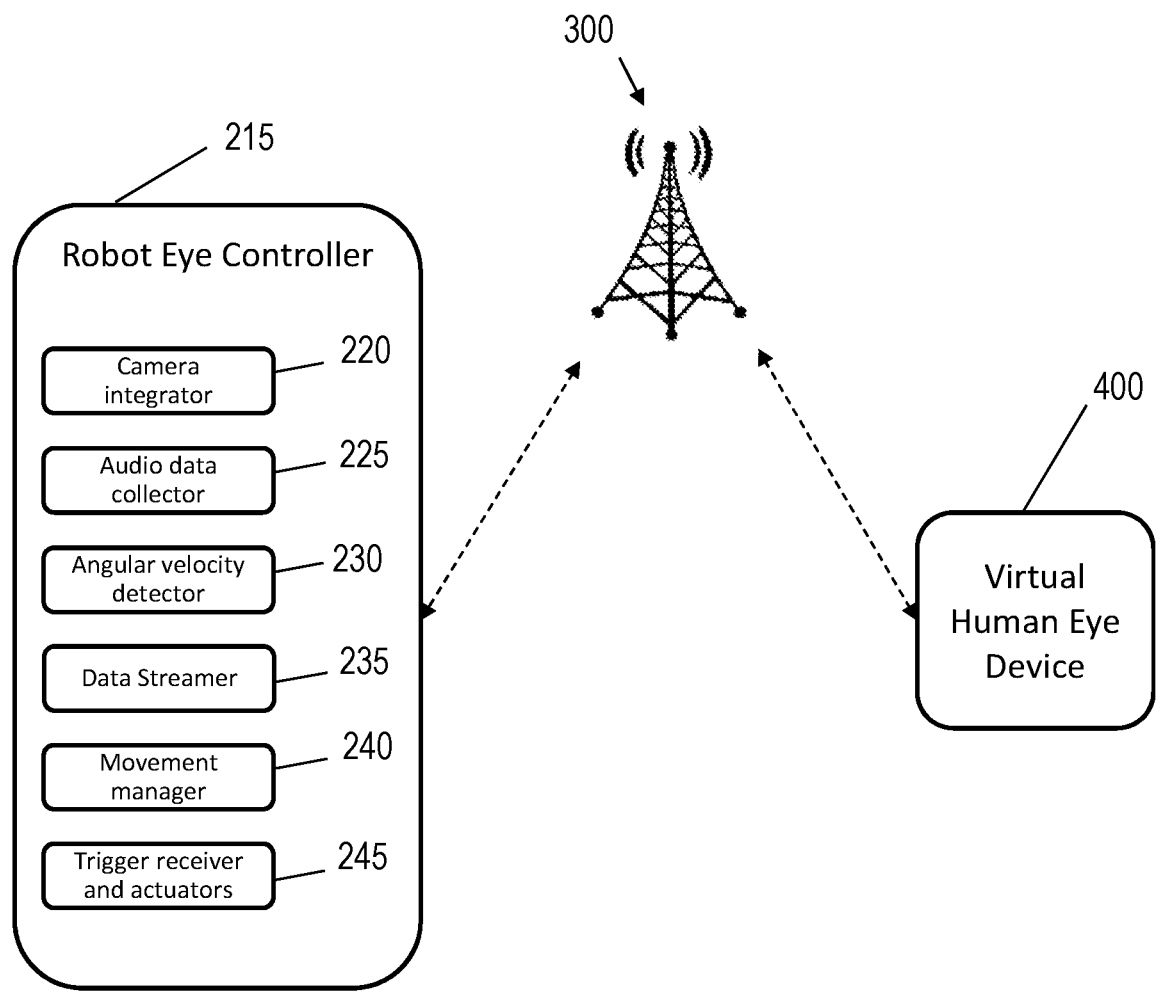
FIG. 8 shows a block diagram of an exemplary environment in accordance with aspects of the invention.

FIG. 8 shows an application of embodiments of the invention that applies features of the invention to robot. In today's world, industries have started capitalizing on the virtual cognitive interfaces which are expected to possess cognition capabilities manifesting emotions to interact naturally with humans. Embodiments include a cognition enabled capability in the 5G service orchestration layer which provides a virtual representation of a human eye on the robot. Embodiments work in 5G service orchestration and provide the triggers to the robot eye controllers to move the eyes based on the situational insights. In the case of cognitive interfaces, a robot eye controller 215 situated at the "eye" part of robot is actuated by the virtual human eye device 400. The robot eye controller 215 at the robot eye is connected to the services via a dedicated cosmetic channel on the 5G telecommunication network 300. In embodiments, these services include the functions of the virtual eye 400 discussed above. Once the robot eye focuses on an object, the information captured by, for example, a camera integrator 220 (and associated cameras), an audio data collector 225 (and associated microphones), and an angular velocity detector 230, and other interrelated devices is streamed by a data streamer 235 over the cosmetic channel to the virtual human eye device 400.

The robot eye controller 215 includes a trigger receiver and actuators 245 and a movement manager to move the robot eye in accordance with the eye image data provided by the virtual human eye device 400. This adds the capability of robots to react more like humans based on the situation viewed by the robot. An advantage of embodiments of the invention is that by working as a service at the service orchestration layer, less computing overhead is needed at the cognitive interface (which may have limited input power) of the robot itself. For example, in embodiments, if a cognitive interface such as a robot views an accident on the road, the robot's eyes will reflect a shocked/tense situation with raised eyebrows and increased eye lenses size. In another example, if a cognitive interface such as a robot moves from a darker location to a brighter location, the eye lenses shrink like the pupil in a natural human eye.

Figure 9:
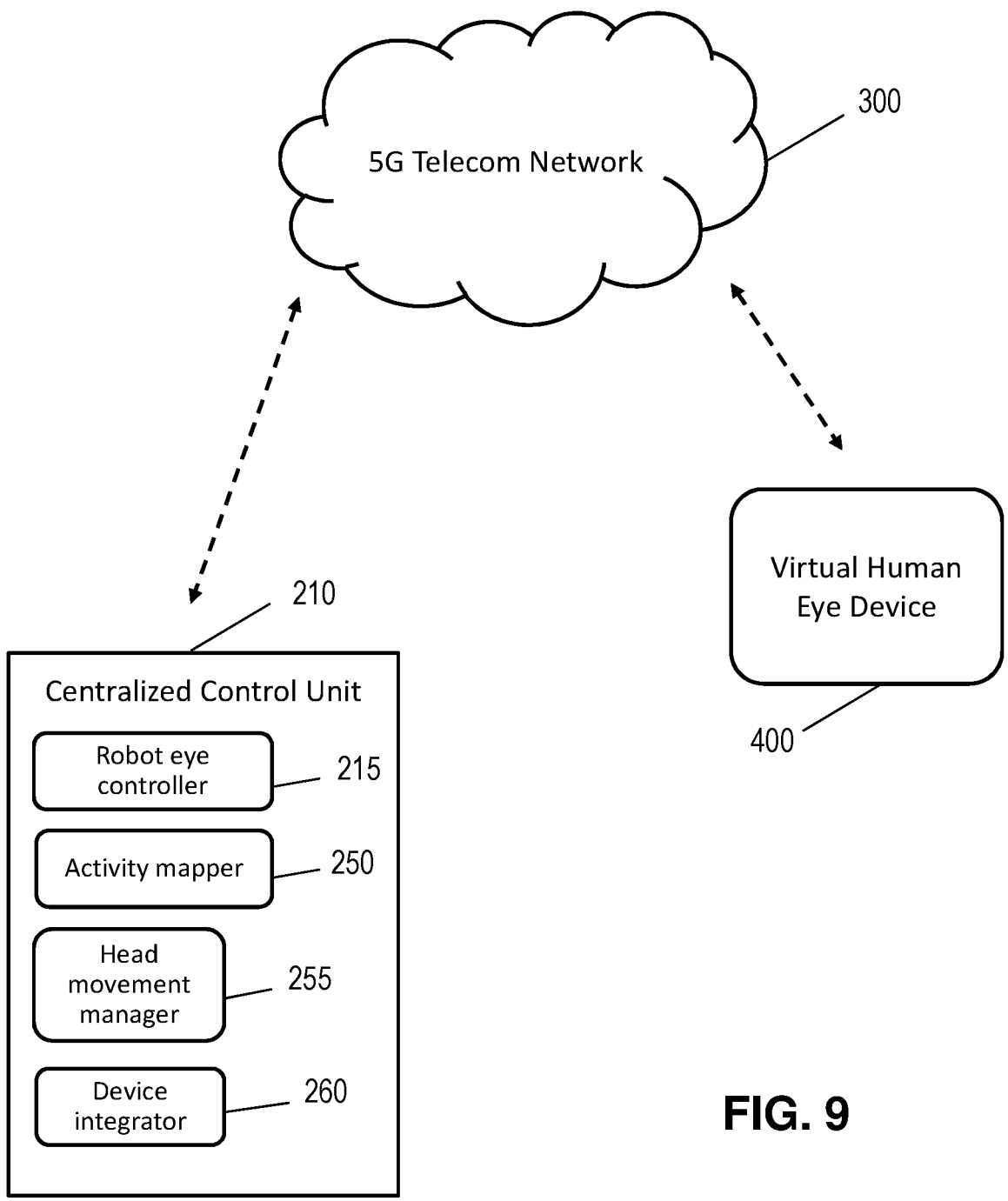
FIG. 9 shows a block diagram of an exemplary environment in accordance with aspects of the invention.

In embodiments (where appropriate), all of the components of the robot eye controller 215 are one or more of the program modules 42 of FIG. 1. In embodiments (where appropriate), any or all of the components/modules of the robot eye controller 215 are split into a larger number of modules and/or combined into a smaller number of modules FIG. 9 shows the robot eye controller 215 as part of a centralized control unit 210 that also includes an activity mapper 250, a head movement manager 255, and a device integrator 260. The robot eye controller 215 controls the robot eye based on the eye image data received from the virtual human eye device 400. The activity mapper 250 collects the various data from the various devices such as cameras, microphones, movement sensors, and other devices which is sent to the virtual human eye device 400 for use in generating the eye image data. The head movement manager 255 controls movement of the robot's head and a device integrator 260 coordinates the head movement with the eye image data for a more realistic appearance.

Figure 10:
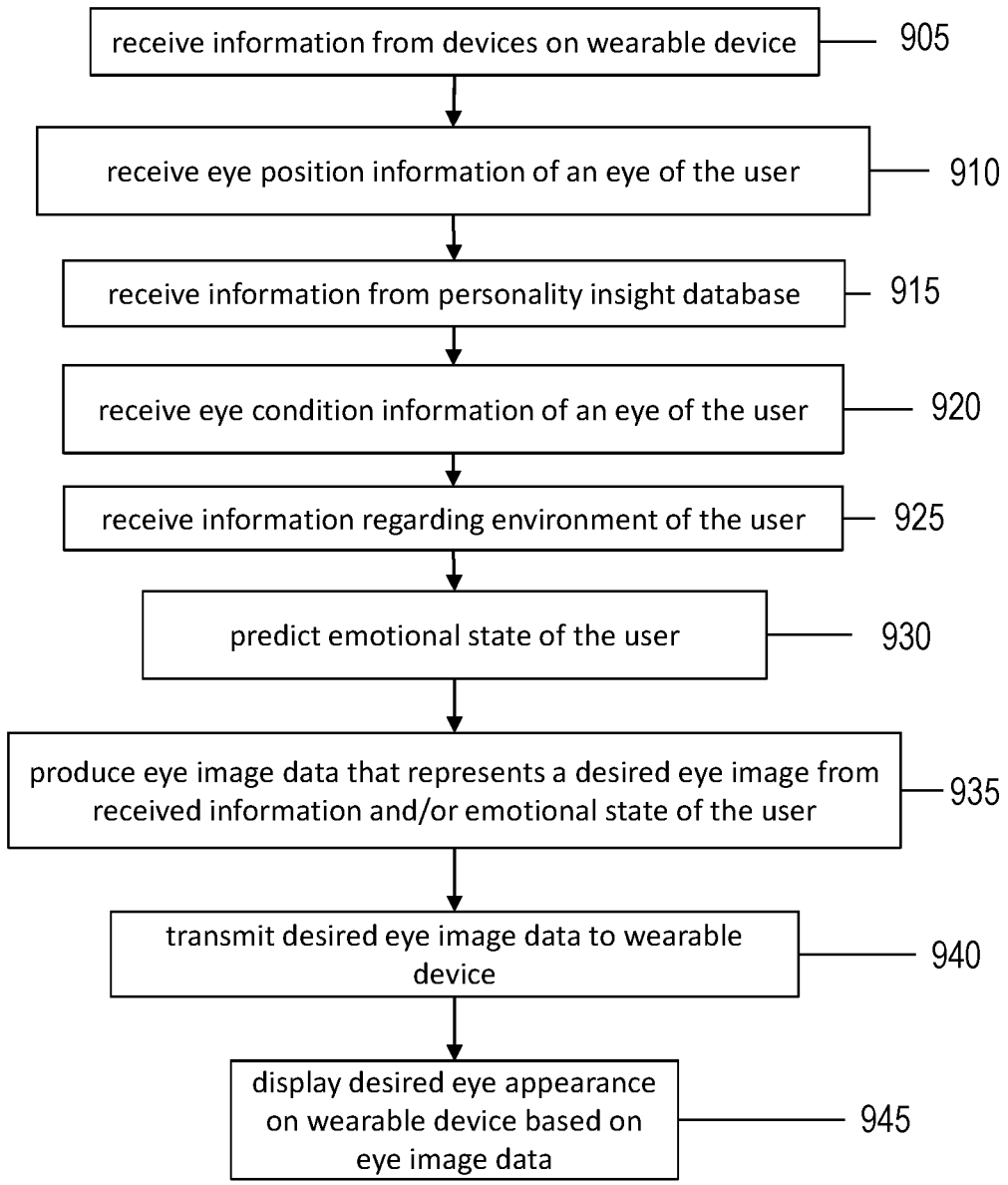
FIG. 10 shows a flowchart of an exemplary method in accordance with aspects of the invention.

FIG. 10 shows a flowchart of an exemplary method in accordance with aspects of the present invention. Steps of the method may be carried out in the environment of FIG. 4 and are described with reference to elements depicted in FIG. 4.

At step 905, the system receives information for devices on a wearable device, for example end user device 205. An example of the end user device 205 is a pair of smart glasses. In embodiments, the virtual human eye device 400 receives head position information from a head position sensor on end user device 205. In embodiments, the head position sensor is located remotely from the smart glasses/end user device 205. In embodiments, the head position detection module 480 of the virtual human eye device 400 receives the head position information. At step 910, the system receives eye position information of an eye of the user. In embodiments, the virtual human eye device 400 receives the eye position information from an eye position sensor on end user device 205. In embodiments, the eye position sensor is located remotely from the smart glasses/end user device 205. In embodiments, the angular inclination detection module 415 of the virtual human eye device 400 receives the eye position information.

At step 915, the system receives information from a personality insight database. In embodiments, the natural response identifier and classifier 430 of the virtual human eye receives the information from the personality insight database. As described above, the information in the personality insight database is used by embodiments to better predict the user's reaction to a particular situation. At step 920, the system receives eye condition information such as, for example, eye redness or color, whether the eye is tearing, pupil size, etc. In embodiments, the other eye information monitor 465 of the virtual human eye device 400 receives the eye condition information from a camera or other sensor integral to, mounted on, or located remotely from the end user device 205.

At step 925, the system receives information regarding the environment of the user. In embodiments, the virtual human eye device 400 receives the information regarding the environment from additional input 500 such as, for example, weather data, temperature data, elevation data, and any other information regarding the environment of the user. At step 930, the system predicts the emotional state of the user. In embodiments, the natural response identifier and classifier 430 of the virtual human eye device 400 predicts the emotional state of the user based on, for example, all or some of the various information described in this disclosure.

At step 935, the virtual human eye device 400 produces eye image data that represents a desired eye image from the information received in any or all of steps 905, 910, 915, 920, 925 and/or emotional state of the user predicted in step 930. At step 940, the virtual human eye device 400 transmits the eye image data to the end user device 205. At step 945, the end user device 205 displays the desired eye appearance on the end user device 205 based on the eye image data received from the virtual human eye device 400.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving, by a computer device, and from a head position sensor, head position information that indicates a position of a user's head;
receiving, by the computer device, and from an eye position sensor, eye position information that indicates a position of a sensed eye of the user;
receiving, by the computer device, and from a personality insight database, personality information about the user;
producing, by the computer device, eye image data that represents a desired image of an eye of the user based on the head position information, the eye position information, and the personality information; and
transmitting, by the computer device, the eye image data to a wearable device worn by the user.

2. The computer-implemented method of claim 1, further comprising updating the eye image data based on at least one selected from the group consisting of: a change in the head position information, and a change in the eye position information.

3. The computer-implemented method of claim 1, further comprising receiving, by the computer device, environment information regarding a current environment of the user, wherein the producing eye image data is based on the environment information.

4. The computer-implemented method of claim 3, further comprising updating the eye image data based on at least one selected from the group consisting of: a change in the head position information, a change in the eye position information, and a change in the environment information.

5. The computer-implemented method of claim 1, wherein the eye image data represents an eye of the user other than the sensed eye.

6. The computer-implemented method of claim 1, wherein the eye image data represents the sensed eye.

7. The computer-implemented method of claim 1, wherein the eye position information is an angular inclination of the sensed eye.

8. The computer-implemented method of claim 1, further comprising receiving, by the computer device, eye condition information that indicates a condition of the sensed eye.

9. The computer-implemented method of claim 8, further comprising predicting, by the computer device, an emotional state of the user based on the eye condition information.

10. The computer-implemented method of claim 8, wherein the eye condition information includes at least one selected from the group consisting of: eye redness, presence of tears, and pupil size.

11. The computer-implemented method of claim 1, wherein the computer device includes software provided as a service in a cloud environment.

12. The computer-implemented method of claim 1, wherein the receiving from a head position sensor, the receiving from an eye position sensor, and the transmitting to a wearable device are performed over a dedicated cosmetic channel of a telecommunication network.

13. A computer program product, the computer program product comprising a computer readable storage medium having program instructions embodied therewith, the program instructions executable by a computing device to cause the computing device to:

receive, from a head position sensor, head position information that indicates a position of a user's head;
receive, from an eye position sensor, eye position information that indicates a position of a sensed eye of the user;
receive, from a personality insight database, personality information about the user;
produce eye image data that represents a desired image of an eye of the user based on the head position information, the eye position information, and the personality information; and
transmit the eye image data to a wearable device worn by the user.

14. The computer program product of claim 13, further comprising program instructions executable by the computing device to cause the computing device to receive environment information regarding a current environment of the user, wherein the eye image data is produced based on the environment information.

15. The computer program product of claim 13, wherein the environment information includes brightness of the current environment of the user.

16. The computer program product of claim 13, further comprising program instructions executable by the computing device to cause the computing device to receive the head position information, receive the eye position information, and transmit the eye image data, over a dedicated cosmetic channel of a telecommunication network.

17. A system comprising:
a processor, a computer readable memory, and a computer readable storage medium;
program instructions to receive, from a head position sensor, head position information that indicates a position of a user's head;
program instructions to receive: from an eye position sensor, eye position information that indicates a position of a sensed eye of the user;
program instructions to receive, from a personality insight database, personality information about the user;
program instructions to produce eye image data that represents a desired image of an eye of the user based on the head position information, the eye position information, and the personality information; and
program instructions to transmit the eye image data to a wearable device worn by the user,
wherein the program instructions are stored on the computer readable storage medium for execution by the processor via the computer readable memory.

18. The system of claim 17, further comprising program instructions executable by the computing device to cause the computing device to
receive the head position information, receive the eye position information, and transmit the eye image data over a dedicated cosmetic channel of a telecommunication network.

19. The computer-implemented method of claim 1, further comprising receiving, by the computer device, and from devices incorporated into the wearable device, a current weather profile, and information from global positioning system (GPS) location services,
wherein the image of an eye of the user is a manifestation of a natural human eye for displaying on the wearable device, and
the producing the eye image data is further based on the current weather profile, and the information from GPS location services.

* * * * *